United States Patent
Kirkby

(10) Patent No.: US 8,271,852 B2
(45) Date of Patent: Sep. 18, 2012

(54) DATA RECOVERY SCHEME

(75) Inventor: Robert H Kirkby, Dunholme (GB)

(73) Assignee: British Telecommunications PLC, London (GB)

( * ) Notice: Subject to any disclaimer, the term of this patent is extended or adjusted under 35 U.S.C. 154(b) by 495 days.

(21) Appl. No.: 12/594,215

(22) PCT Filed: Mar. 28, 2008

(86) PCT No.: PCT/GB2008/001078
§ 371 (c)(1), (2), (4) Date: Oct. 1, 2009

(87) PCT Pub. No.: WO2008/119960
PCT Pub. Date: Oct. 9, 2008

(65) Prior Publication Data
US 2010/0115374 A1    May 6, 2010

(30) Foreign Application Priority Data
Feb. 4, 2007   (GB) .................... 0706427.2

(51) Int. Cl.
*H03M 13/00* (2006.01)
*H03M 13/03* (2006.01)
*H04B 3/46* (2006.01)
*H04B 15/00* (2006.01)
*H04L 7/00* (2006.01)
*H04L 1/00* (2006.01)

(52) U.S. Cl. ........ 714/762; 714/758; 714/788; 714/790; 714/775; 714/789; 714/803; 714/817; 714/821; 375/224; 375/227; 375/285; 375/363; 370/241; 370/242

(58) Field of Classification Search .................. 714/758, 714/762, 788, 790, 775, 789, 803, 817, 821; 375/224, 227, 285, 363
See application file for complete search history.

(56) References Cited

U.S. PATENT DOCUMENTS 4,684,984 A * 8/1987 Hirano ..................... 375/240.16
(Continued)

FOREIGN PATENT DOCUMENTS

WO    2006/042274    4/2006

OTHER PUBLICATIONS

International Search Report for PCT/GB2008/001078, mailed Sep. 1, 2008.

*Primary Examiner* — John J Tabone, Jr.
(74) *Attorney, Agent, or Firm* — Nixon & Vanderhye PC

(57) ABSTRACT

A method of recovering data in a line signal which is predicted to be subjected to repetitive noise impulses, the line signal comprising a series of data frames, the method comprising the steps of: predicting a group comprising one or more frames in said line signal which are expected to be corrupted by a noise signal; blanking said group of one or more frames which are predicted to be corrupted; determining the preceding and succeeding frames adjacent to said group; and including in each said group of one or more frames one or more parity blocks wherein if said noise signal deviates from its predicted timing interval or duration and corrupts the data carried in one or more of said frames adjacent to said group, the corrupted data is recovered using one or more of said parity blocks of said group of blanked frames and the other one of said adjacent frames.

15 Claims, 7 Drawing Sheets

U.S. PATENT DOCUMENTS

| | | | |
|---|---|---|---|
| 6,820,054 B2 * | 11/2004 | Erell et al. | 704/233 |
| 7,822,154 B2 * | 10/2010 | Chen et al. | 375/346 |
| 2002/0069038 A1 | 6/2002 | Cooper | |
| 2003/0031198 A1 | 2/2003 | Currivan | |
| 2007/0019718 A1 | 1/2007 | Heise | |
| 2007/0248181 A1 * | 10/2007 | Clausen et al. | 375/285 |
| 2008/0232444 A1 * | 9/2008 | Tzannes | 375/219 |
| 2010/0054150 A1 * | 3/2010 | Oksman et al. | 370/252 |

* cited by examiner

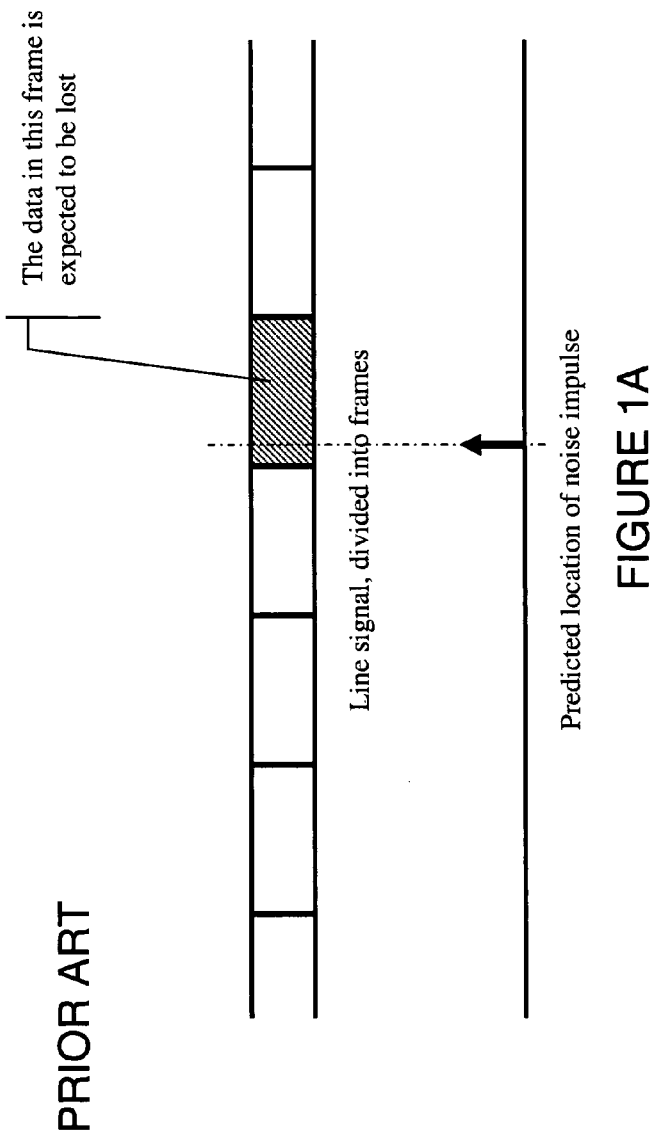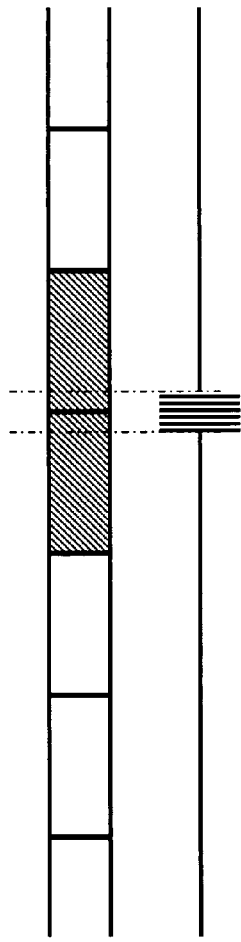
FIGURE 1A
FIGURE 1B
PRIOR ART

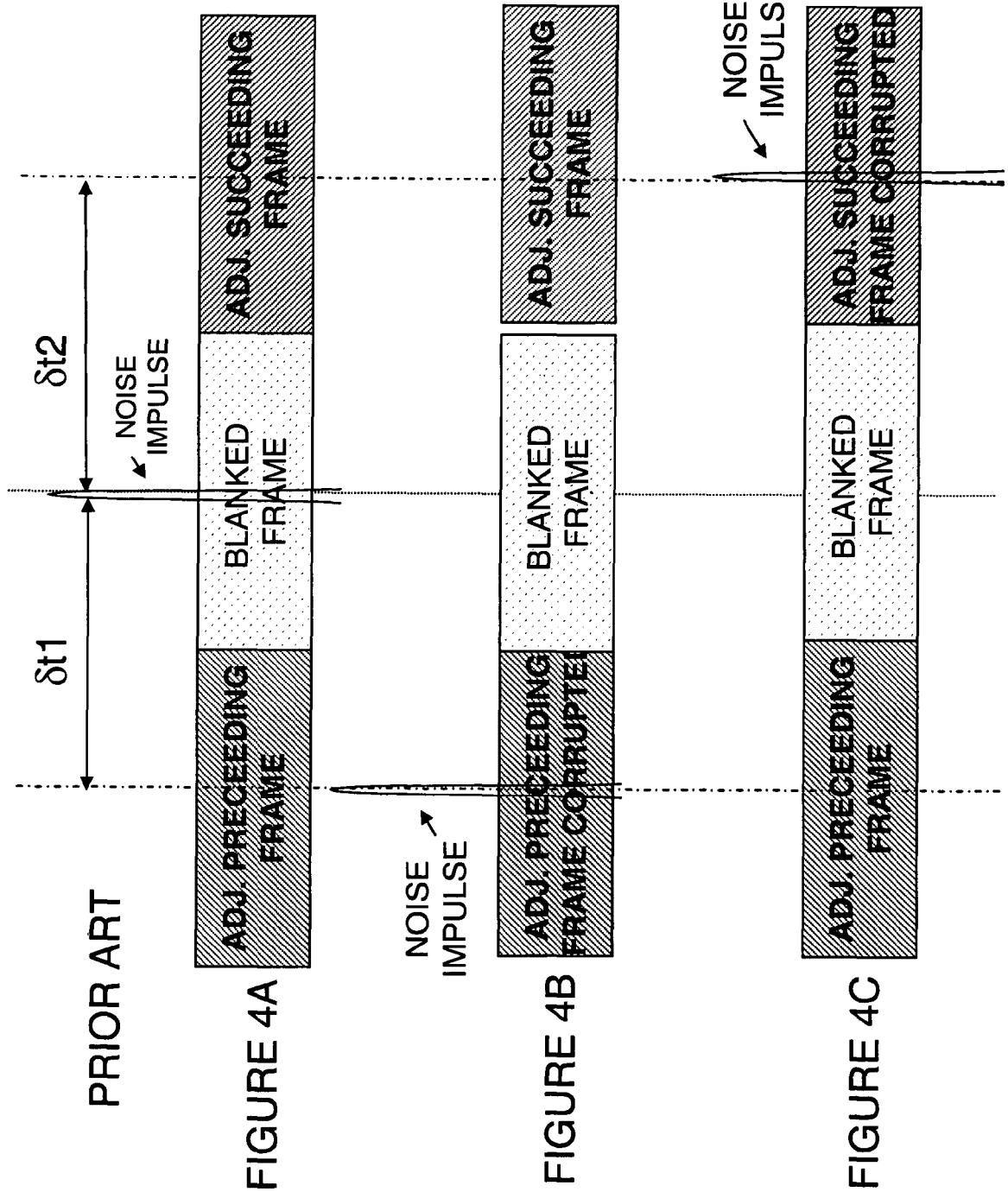

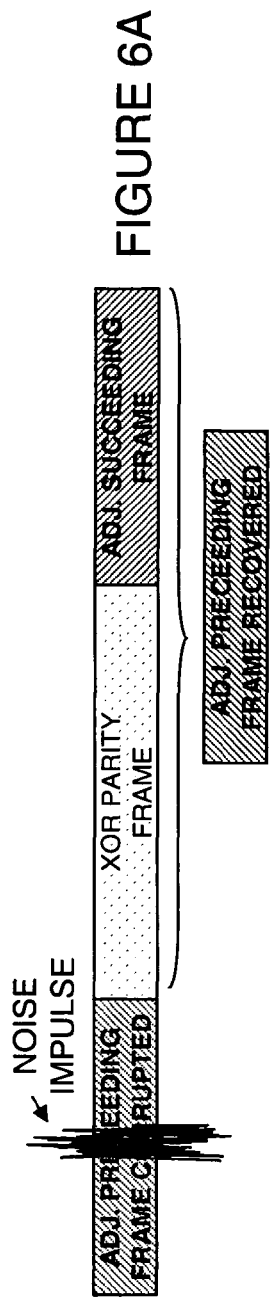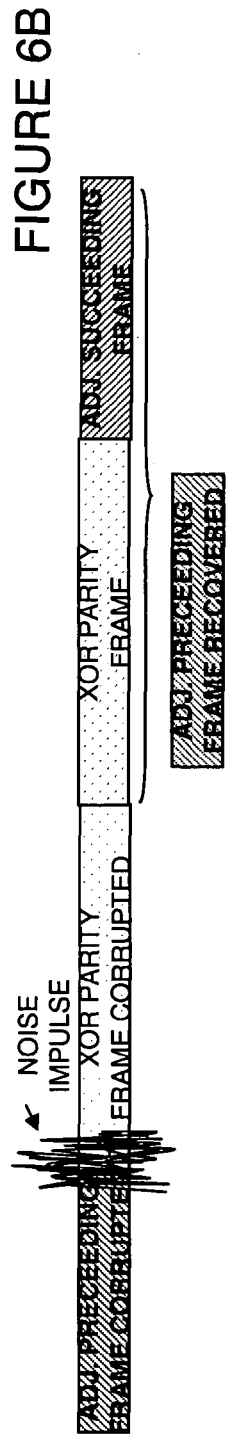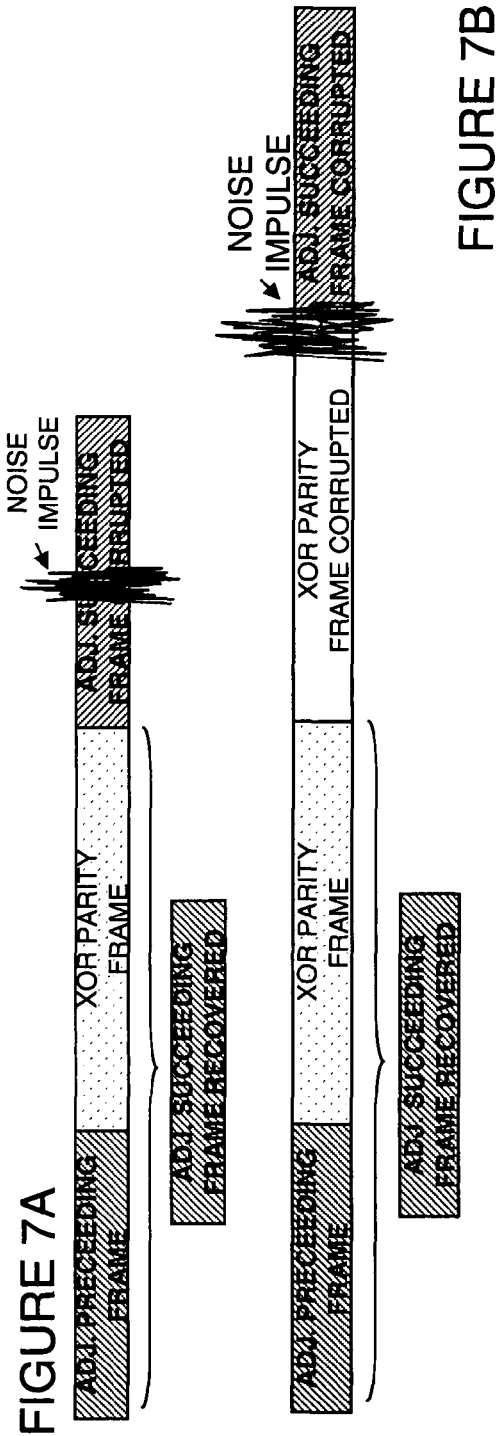

DATA RECOVERY SCHEME

This application is the U.S. national phase of International Application No. PCT/GB2008/001078, filed 28 Mar. 2008, which designated the U.S. and claims priority to Great Britain Application No. 0706427.2, filed 2 Apr. 2007, the entire contents of each of which are hereby incorporated by reference.

The present invention relates to a method for recovering data in a digital signal which is subjected to repetitive impulsive disturbances.

In particular, but not exclusively, the method relates to a data recovery scheme which uses a predictive blanking technique and which exploits the inherent unpredictiveness of a real communications system to recover data which is lost through that inherent unpredictiveness.

Interference pulses generated by electrical disturbances are a significant source of noise in local access networks such as twisted copper pair networks. Many types of noise can affect communication signals and many techniques are known in the art to reduce the errors in a communication which is subjected to noise. A common technique to deal with noise is to segmentise or frame a communications signal and to interleave the frame or segments. Typically interleaving is conducted on a frame-by-frame or bit-by-bit basis.

Interleaving techniques may not provide sufficient protection to prevent data being lost through impulsive noise events occurring within the span of an, interleaver such as those shown schematically in FIGS. 1A and 1B of the accompanying drawings (which are described in more detail herein below). Such noise events are also referred to in the art as punctured noise events—see, for example, the submission entitled "G.vdsl, ADSL: Impulse Noise Monitoring and Punctured Noise Events" by Les Humphrey and Andrew Wallace, submitted to the ITU Study Group 15 as Document SD-046 January 2007. This prior art discusses a number of impulses noise events, a selection of which are shown repeated in FIGS. 2A to 2D of the accompanying drawings, and proposes various schemes to enable data recovery. However, the data recovery schemes are not perfect and data can still be lost.

Short-lived impulsive noise events such as those shown in FIGS. 2A to 2D are potentially very disruptive and are known to potentially impact the quality of service provided on digital subscriber lines (DSLs) such as ADSL, HDSL, VDSL, xDSL, etc., and to limit the range at which various types of digital subscriber lines can be deployed from the nearest local exchange facility to customer premises. Interference pulses can be repetitive, for example, if their source is linked to the alternating current waveform of a electrical power supply, such as that known as "mains electricity". Sources of repetitive electrical impulsive noise (REIN) include domestic appliances powered by mains electricity. In the UK, the mains electrical power has a nominal frequency of 50 Hz which results in interference pulses being produced at approximately 10 ms or 20 ms intervals in line signals in the digital access communications network between subscribers and the local telephone exchange.

Many techniques are known in the art which address REIN. United States Patent Application US20070019718 entitled "Method and System for Suppressing an Interference Signal" describes how periodic interference signals can be suppressed during a bi-directional data transmission of data symbols between two xDSL transceivers. Blanking is another technique known in the art which may be used to mitigate the effects of REIN, for example, see the proposal by Krista S. Jacobsen, Shanti Kolluri (2Wire), entitled "REIN, REIN, Go Away—The Return of Frame Blanking", ITU-T SG15 Q4 Ghent, Belgium, 12-16 Jun. 2006, filename: GB-081R1.doc. This document provides an overview of blanking techniques and discusses its performance against forward error correction (FEC).

Blanking the line signal of a digital subscriber line is one possible solution for limiting the amount of data lost through REIN events. Blanking seeks to prevent data loss in the DSL signal by removing any payload data from the line signal transmitted when the REIN event occurs. Whilst this solution comes at a cost in the data carrying efficiency of the line signal, blanking is nonetheless a relatively low cost solution to deal with REIN events. To implement blanking, the subscriber's modem pair needs to be able to predict when the REIN will occur and the processing capability which can be provided in modem pair equipment is now sufficiently advanced for relatively reliable models to provide predictions of when an impulsive disturbance is likely to impact the modem's line signal so that the modem can abstain from transmitting data during that time.

Nonetheless, in real communications systems, it is not possible to generate 100% accurate models for when an impulsive disturbance is going to occur as the factors generating the noise impulse are not fixed but change over time.

Returning now to FIGS. 1A and 1B of the accompanying drawings, it is assumed that in any communications system where blanking apparatus has been configured to mitigate the effects of REIN, the line signal has been divided into suitable 'frames'. In this context, a frame comprises any suitable uniform duration unit of transmission appropriate for the implementation of the blanking scheme and for administrative purposes for which a unit of data is either transmitted intact or if not, the data carried by the frame is lost, i.e., is not recoverable. For example, in ADSL a frame can comprise a symbol whereas in a pulse oriented system a frame may comprise one or more pulses. Each frame is of short duration and a noise event can have a duration which exceeds that of a plurality of contiguous frames. Where this is the case, groups of contiguous frames are blanked to prevent them carrying data when such a longer duration impulsive noise event is predicted to occur.

FIG. 1A shows how a line signal has been divided into a series of frames, and how at the predictive point where a noise event comprising a narrow noise impulse (the term narrow here refers to the noise pulse full width being less than the duration of a frame of the line signal) occurs, the data in a frame can be expected to be lost. In FIG. 1A, to prevent data from being lost when the noise impulse is predicted to occur, a single frame is blanked if its transmission is predicted to coincide with a noise pulse which is predicted to corrupt the contents of that frame. In this context, the term 'blanking' refers to the conventional technique of simply ensuring no data is carried is carried by the frame which is being transmitted at the time the noise pulse is expected.

FIG. 1B shows the situation where a noise impulse straddles two adjacent frames in the line signal. To compensate for this situation, a plurality of frames is blanked, depending on the anticipated width of the noise impulse. For example, in FIG. 2B, a noise pulse of some width straddles two adjacent frames, and so a classical blanking strategy would blank both frames.

The blanking proposal by Jacobsen et al known in the art suffers from a limitation in that if the prediction is very slightly wrong, then not only is data not being transmitted by the blanked frame on the line signal, but any data carried in an adjacent frame to the blanked frame or frames whose transmission does coincide with the impulsive noise event will be lost. This increases the inefficiency of the blanking system.

To account for drift in the noise signals, one could allocate a number of frames which are blanked on a regular basis by the blanking mechanism. This number could then be changed to adapt to the drift in any expected repetition rate of REIN noise impulses, for example, by using a phase locked loop process which could be configured to track the mains power phase drifts. Thus the blanking systems known in the art can increase the number of frames forming a blanking group to blank out a slightly longer period of the line signal than the anticipated noise burst to ensure data is not lost from the frames adjacent to the blanking group.

Some communications systems, such as ADSL, incorporate a small gap between the frames of the line signal which can be used for blanking purposes. This gap is known in the art as a 'cyclic prefix' and is $1/69$ ms long. In such systems if a noise pulses is sufficiently narrow and coincides with the transmission of the gap then the noise event does not corrupt any data carried by the adjacent frames to the gap. If the impulse does not coincide completely with a blanked frame, the noise event could extend over a frame boundary but then terminate in the cyclic gap so that an adjacent frame is not impacted by the noise event. The presence of gaps in the line signal can thus increase the potential usefulness of the blanking technique as it reduces the likelihood of adjacent frames being impacted if the predicted timing of an impulsive noise event is slightly wrong.

FIG. 3 shows schematically in simplified form how a line signal comprising a series of frames F1 . . . Fn subjected to repetitive noise impulses can prevent data loss by using a blanking scheme. In FIG. 3, the noise impulses are shown in a very simplified form which has an easily determined pulse centre occurring at a periodic interval of $\Delta T$, i.e., if a first noise impulse occurs at time $T_0$ then the noise impulse repeats at $T_0+\Delta T, T_0+2\Delta T, T_0+3\Delta T, \ldots, T_0+n\Delta T$, where n is an integer if the noise impulse repeats in a strict periodic manner. Those of ordinary skill in the art will appreciate that the pulse-shapes of the noise waveforms shown in FIG. 3 (and in FIGS. 4 to 7) are greatly simplified and provided purely for representational purposes. In practice, a variety of pulse-shapes and durations for noise impulses are possible in real communication systems, for example, such as those shown in FIGS. 2A to 2D and in the prior art document by Les Humphrey and Andrew Wallace.

The impact of any change from the predicted position for an impulsive noise on the line signal is shown in more detail in FIGS. 4A to C, which show the effect when REIN pulses drift slightly away from being repeated at the same timing interval $\Delta T$ by a small drift in time $\delta T$. A series of three frames are shown in a line signal: a blanked frame, a frame immediately preceding the blanked frame and a frame immediately succeeding the blanked frame. Here it is assumed that the predicted timing interval of an impulse is $T_0+n\,\Delta T$, where n is some integer, and the frame which coincides with the predicted occurrence of the pulse is blanked by the blanking apparatus associated with the transmitter of the line signal.

FIG. 4B shows schematically how, due to a very small drift $\delta t1$ in the predicted timing of the impulse (either sooner or later), the preceding frame is instead corrupted and the blanked frame remains unaffected. Similarly, in FIG. 4C, due to the actual pulse occurring at a time which has slightly drifted $\delta t2$ in the opposite direction (i.e., later or sooner) from when the impulse was originally predicted to occur, the succeeding frame is corrupted and the blanked frame remains unaffected.

The invention and its embodiments as described herein seek to obviate and/or mitigate the above limitations of the prior art by providing method of data recovery which can be used to recover data from a communications signal which has been subject to an impulsive noise event, including punctured noise events. The invention and its embodiments described herein seek to improve the data carrying efficiency of the line signal when the actual timing of an impulse differs from the predicted timing used by blanking apparatus to blank out a group of one or more frames of the line signal.

The aspects and preferred features of the invention are as described below and by the accompanying independent and dependent claims respectively, and may be combined in any appropriate manner apparent to those skilled in the art.

One aspect of the invention relates to a method of recovering data in a line signal lost by a repetitive noise signal corrupting the line signal, the noise signal comprising noise events having predictable timing and duration characteristics, the line signal comprising a series of data frames, the method comprising for each predicted noise event:

determining a group comprising one or more frames in said line signal, said group being coincident with the predicted timing and duration of a said predicted noise event signal; and determining how many frames within the coincident group will be lost due to coincidence with said predicted noise event; and including in the coincident group sufficient redundant data to enable recovery of data lost from said line signal by a receiver of said line signal in the event one or more of said duration and timing characteristics differ from their predicted value(s).

At least one frame of said group may be coincident with the predicted timing and duration of a said predicted noise event signal; and wherein sufficient redundant data is included in said at least one coincident frame to enable recovery of data lost from said group of frames in said line signal by a receiver of said line signal in the event one or more of said duration and timing characteristics differ from their predicted value(s).

The method may further comprise predicting when a said predicted impulse noise event will occur and how much data it will obliterate.

Within said group of predicted coincident frames lost data may be recovered using said redundant data in the event one or more predicted coincident frames survive within a said noise event.

The method may further include recovering lost data using redundant data and one or more uncorrupted adjacent frames of said line signal.

The method may further include determining from a said predicted coincident group of frames, one or more adjacent frames predicted to be not coincident with said noise event; and if data of said one or more preceding and/or succeeding adjacent frames is lost, recovering the data lost from said adjacent frames from said one or more predicted coincident frames at a receiver using said redundant data.

The redundant data may be included within in one or more frames of each group using a parity data correction scheme.

The method may further comprise determining one or more preceding and succeeding frames adjacent to said group; and if data of said one or more preceding and/or succeeding frames adjacent to said group of frames is lost due to one or more of said duration and timing characteristics differing from their predicted value(s), recovering said data at a receiver using said redundant data, whereby said redundant data included in one or more frames using a parity data correction scheme enables the lost data to be recovered using said redundant data and one or more uncorrupted adjacent frames of said line signal.

The parity data correction scheme may be implemented as an XOR operation by one or more frames in said group and one or more uncorrupted adjacent frames.

The parity data correction scheme may be implemented as a Reed-Solomon error correcting code by one or more frames in said group and one or more uncorrupted adjacent frames.

Another aspect of the invention relates to a method of recovering data in a line signal which is predicted to be subjected to repetitive noise impulses, the line signal comprising a series of data frames, the method comprising the steps of:
  predicting a group comprising one or more frames in said line signal which are expected to be corrupted by a noise signal;
  blanking said group of one or more frames which are predicted to be corrupted;
  determining the preceding and succeeding frames adjacent to said group; and
  including in each said group of one or more frames one or more parity blocks to enable recovery of data lost if said noise signal deviates from its predicted timing interval or duration and corrupts the data carried in one or more of said frames adjacent to said group, the corrupted data being recoverable by a receiver of said line signal using one or more of said parity blocks of said group of blanked frames and the uncorrupted other one of said adjacent frames of said line signal.

The parity operation may comprise an XOR operation.

The parity operation may operate in combination with an interleaving data recovery scheme.

Another aspect of the invention relates to apparatus arranged to recover data in a line signal lost by a repetitive noise signal corrupting the line signal, the noise signal comprising noise events having predictable timing and duration characteristics, the line signal comprising a series of data frames, the apparatus comprising:
  one or more signal processors arranged for each predicted noise event, to determine a group comprising one or more frames in said line signal, said group being coincident with the predicted timing and duration of a said predicted noise event signal; and
  one or more signal processors arranged to determine how many frames within the coincident group will be lost due to coincidence with said predicted noise event; and
  one or more signal processors arranged to include in the coincident group sufficient redundant data to enable recovery of data lost from said line signal by a receiver of said line signal in the event one or more of said duration and timing characteristics differ from their predicted value(s).

The apparatus may further comprise means to implement appropriate steps in any of the method aspects or their preferred features.

Another aspect of the invention relates to apparatus arranged to transmit a line signal which is predicted to be subjected to repetitive noise impulses, the line signal comprising a series of data frames, in a communications network to a receiver apparatus, the apparatus comprising:
  means to predict a group comprising one or more frames in said line signal which are expected to be corrupted by a noise signal;
  means to blank said group of one or more frames which are predicted to be corrupted;
  means to determine the preceding and succeeding frames adjacent to said group;
  means to include in each said group of one or more frames one or more parity blocks, wherein if said noise signal deviates from its predicted timing interval or duration and corrupts the data carried in one or more of said frames adjacent to said group, the corrupted data is recoverable by receiving apparatus using one or more of said parity blocks of said group of blanked frames and the other one of said adjacent frames.

The apparatus may further comprise a processor arranged to determine said parity data and provide said data to said signal processors for insertion into frames of said line signal to enable subsequent data recovery.

Another aspect of the invention relates to a signal processor arranged to receive a line signal transmitted by any of the above apparatus aspects and the preferred features or any other apparatus having means to implement the method aspects of the invention and the preferred method features detailed above and in the claims, the signal processor comprising means to recover the corrupted data when received in said transmitted line signal using one or more of said parity blocks of said group of blanked frames and the other one of said adjacent frames.

Another aspect of the invention relates to a line signal comprising a group of one or more frames conveying one or more parity blocks enabling data recovery from a corrupted line signal, the data being recoverable by any one of the above method aspects.

Another aspect of the invention relates to a line signal sent by apparatus according to any of above aspects.

Another aspect of the invention relates to a communications system comprising a transmitter and a receiver, the transmitter being collectively to implement appropriate steps in any method aspect to enable recovery of one or more frames of lost data by said receiver.

The data recovery scheme of the invention is suitable for mitigating data loss caused by impulsive noise events such REIN impulse events which occur over a timescale less than that required to transmit a frame of a line signal. The scheme proposed exploits the presence of any slight inaccuracies in the predictive models used by blanking apparatus for determining when a noise event will occur. Instead of each frame selected for blanking being totally blanked when the noise signal is expected to occur, one or more frames incorporate parity information into the frames selected for "blanking" by the blanking apparatus. The parity blocks are used to recover data from the lost frames by being combined with data carried by a frame or frames adjacent to the other side of the "sequence of frames selected for blanking". If the noise impulse blanks the actual frame, then the invention does not have any effect, but if a slight variation in timing occurs causing data carried by an adjacent frame to be lost, the invention enables the lost data to be recovered. Accordingly, as one cause of prediction error is the feature of the mains electrical power frequency which is known to vary slightly about its nominal value, the invention is likely to be used and so improves the data carrying efficiency of the line signal.

Preferred embodiments of the invention will now be described with reference to the accompanying drawings which are by way of example only, and in which:

FIG. 1A shows a single blanked frame in a blanking scheme known in the art;

FIG. 1B shows how multiple frames can be blanked in a blanking scheme known in the art;

FIG. 4A shows schematically a blanking scheme known in the art to mitigate the effects of the REIN shown in FIG. 1;

FIGS. 4B and 4C show schematically how the blanking scheme shown in FIG. 2A is impacted by small drifts in the timing of the REIN predicted timing;

FIG. 6A shows schematically how a preceding frame is recovered in accordance with an embodiment of the invention comprising a data recovery scheme supporting single frame redundancy;

FIG. 6B shows schematically how a preceding frame is recovered in accordance with an embodiment of the invention comprising a data recovery scheme supporting multiple frame redundancy;

FIG. 7A shows schematically how a succeeding frame is recovered in accordance with an embodiment of the invention comprising a data recovery scheme supporting single frame redundancy;

FIG. 7B shows schematically how a succeeding frame is recovered in accordance with an embodiment of the invention comprising a data recovery scheme supporting multiple frame redundancy.

In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in simplified diagrammatic form to facilitate explanation and additional detail known to one of ordinary skill in the art has been omitted for clarity. The description of preferred embodiments is not intended to limit the scope of the claims appended hereto.

As mentioned hereinabove, the invention exploits errors in the predicted timing for repetitive noise impulses which are made using conventional blanking equipment associated with a transmitter in a communications system. Conventional blanking equipment uses noise models which predict when noise will obliterate the signal to be transmitted which can be in error. For example, in practice, an obliterated period in a frame may have a different length caused by a noise-generating disturbance such as, for example, where noise is causes by a domestic appliance being turned on or off in the residence to which the digital subscriber line service has been connected.

Those of ordinary skill in the art will appreciate that if the obliteration of the line signal lasts for too long, the data link for the DSL service cannot maintain its data rate nor can the data rate be maintained if, for example, the actual timing of the pulse can differ from its predicted time. This latter problem occurs when the link data rate is not phase locked to the mains cycle. In the UK, the mains electrical generating equipment is known to vary slightly with the electrical loading so that although the number of cycles in a day is controlled, even clocks using synchronous motors can drift by a minute or two during the day.

One embodiment of the invention seeks to provide a data recovery scheme which addresses errors which would otherwise corrupt frames in the line signal caused by such gentle drift in the actual timing of noise impulses from the predicted times. As those of ordinary skill in the art will appreciate, if the mains rate varies then so does the data rate lost via blanking. Even when the mains rate varies slightly, the effect on constant bit rate (CBR) data is to fill and/or empty the buffers which ensure the bit rate is constant, for example, the buffers which store data at the transmission equipment prior to its transmission at the CBR. Transmission equipment must be configured to adapt to the minimum bit rate which can be supported with a constant rate data stream. This requires the memory buffers to be capable of holding sufficient data to support a CBR for several minutes.

Figure 2B:
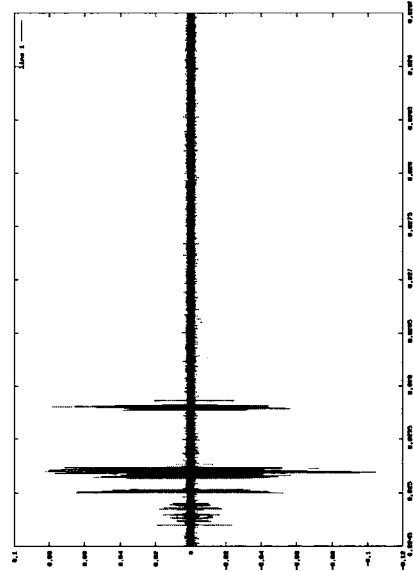
FIGS. 2A to 2D show a variety of short-lived noise events exhibiting a variety of pulse-shapes and durations in real communications systems.
Figure 2D:
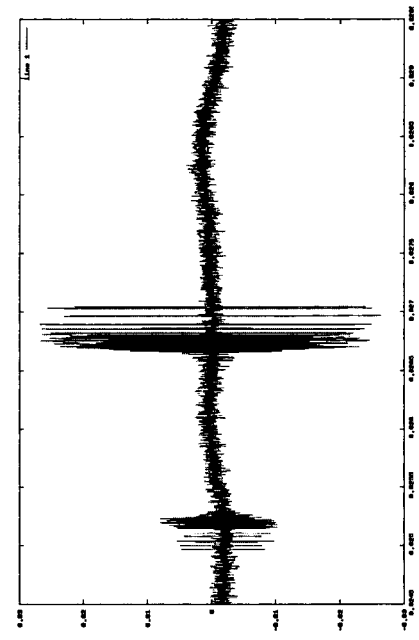
Figure 2A:
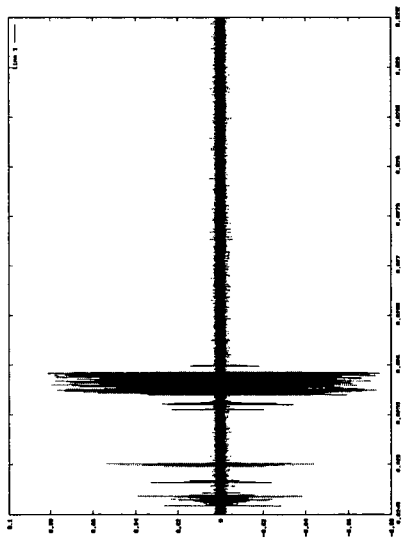
Figure 2C:
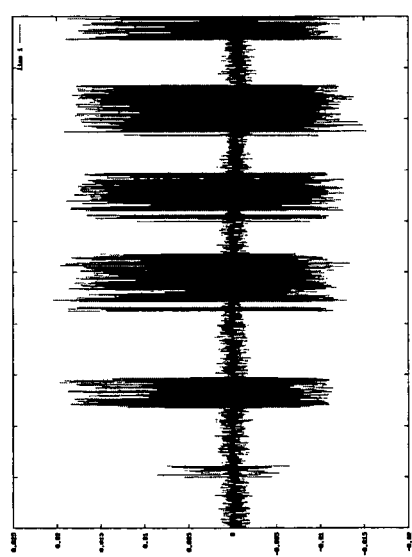
Figure 3:
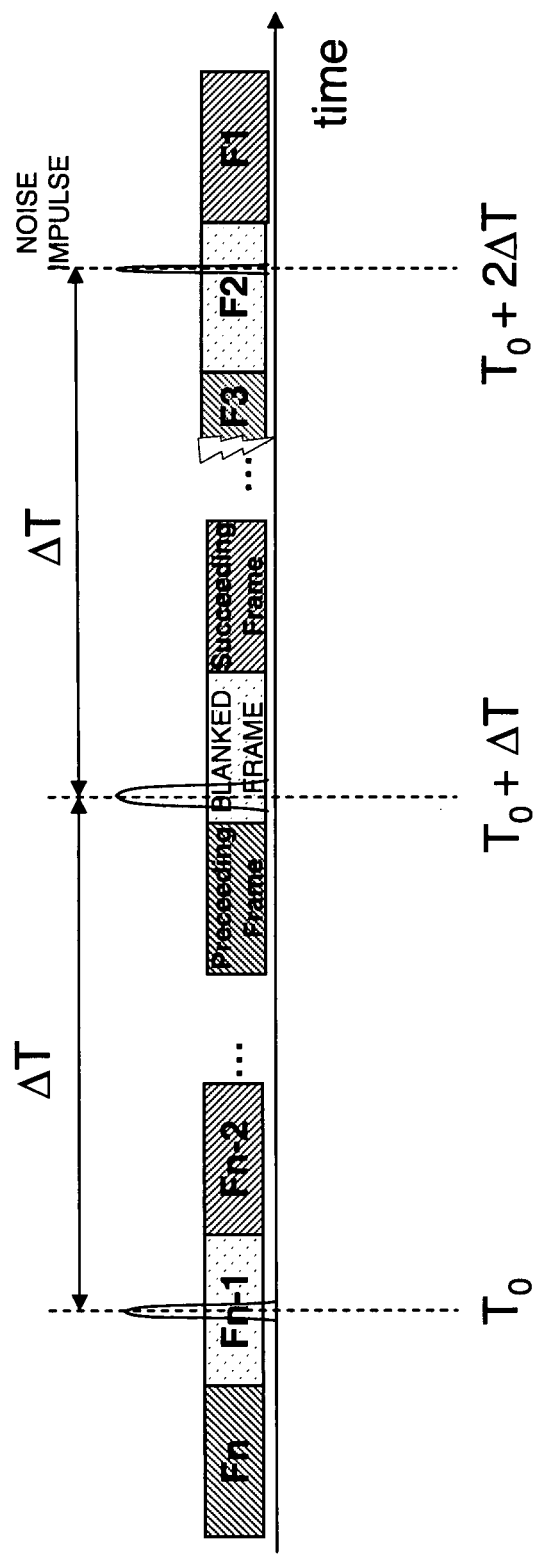
FIG. 3 shows a signal subjected to repetitive electrical noise impulses as is known in the art.
Figures 5A, 5B, 5C:
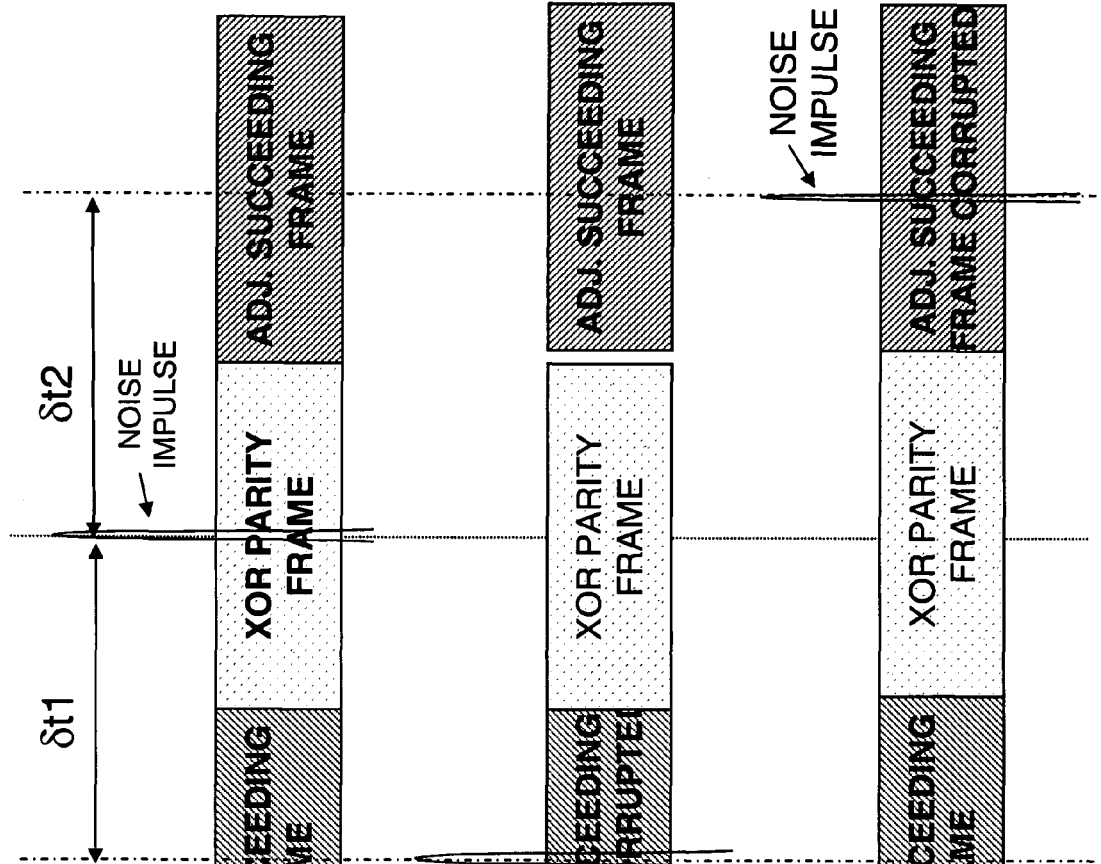
FIGS. 5A to 5C show schematically how the data recovery scheme according to an embodiment of the invention enables data to be recovered in the event of REIN noise drifting from its predicted timing.

In FIGS. 5A to 5C of the accompanying drawings, a data recovery scheme according to an embodiment of the invention is shown schematically. The data recovery scheme exploits the prediction error for the anticipated timing of a noise impulse which is expected to impact a single blanked frame in a line signal. In each of FIGS. 5A to 5C, the impulse is shown schematically having an idealised form and, as those of ordinary skill in the art will appreciate, in practice more complex pulse-shapes occur.

In this embodiment of the invention, in each of the blank frames a parity (or 'checksum') block is provided such that given one blank frame and either of the adjacent normal frames one can be used to recover the other adjacent normal frame in the event that an adjacent normal frame is impacted by a small drift in the predicted timing of the impulsive noise event.

In a preferred embodiment of the invention, the parity scheme implemented by the blanking apparatus comprises a simple XOR parity:

blank=XOR(preceding, succeeding)
then
preceding=XOR(blank, succeeding)
and succeeding=XOR(blank, preceding)

Those of ordinary skill in the art will appreciate that priority schemes with different "priority arithmetic" can be implemented for other embodiments of the invention. But the priority arithmetic used for this embodiment of a parity data recovery scheme according to the invention enables recovery when a single frame is expected to be impacted by a noise impulse. If the time prediction is slightly in error so that one of the two adjacent frames to the frame carrying the priority block (also referred to herein as a blanked frame) is unexpectedly lost, the data lost is recoverable using the unexpectedly surviving "blank" frame carrying the priority block by processing the parity block with the other safely received frame at the receiving end of the line signal.

FIG. 5A to 5C show how data is recoverable schematically. In FIG. 5A, no drift in the timing of the impulse has occurred, and the "blanking frame" with the XOR parity block is subject to interference by the noise impulse. However, in FIGS. 5B and 5C, the noise impulse has drifted from its predicted timing position so that the "blanking XOR parity frame" is now no longer corrupted and instead one of the adjacent frames is corrupted.

This data recovery scheme is suitable where it is possible to provide one redundant blanked frame per frame potentially corrupted, to such as was shown in FIGS. 5A to 5C and in FIGS. 6A and 7A, where in each case there is only one redundant frame. In FIGS. 6A and 7A a relatively narrow noise pulse is shown which impacts only one frame due to its timing drift, i.e., the pulse remains narrow and its position can be uncertain within tone frame. This tolerance of prediction error can be used to survive unpredictable pulse movement and/or to maintain phase lock even if the only noise detection mechanism is detection of actual loss of a frame.

In an alternative embodiment, if a noise impulse could impact more than one blanked frame (such as was shown in FIG. 1B and is shown in FIGS. 6B and 7B) then a plurality of frames in the line signal are selected for blanking by the blanking equipment of the transmission apparatus. Each frame selected for blanking is provided with an identical copy of the parity block to enable a data recovery of adjacent succeeding or preceding frames such as is shown in FIGS. 6B and 7B. In FIGS. 6B and 7B, the blanking equipment of the transmission equipment determines that an impulse is expected which may impact more than one frame and so two blanked frames are provided with an identical parity block to enable recovery of an adjacent data frame to the group of blanked frames. In this embodiment, if one of the pair of blanked frames and an adjacent data carrying frame in the line signal are impacted by the timing drift (and/or spread in the impulse signal), the adjacent frame carrying data is recoverable using the parity block carried by the other blanked frame. As those skilled in the art will appreciate, the parity information is determined from the data content of the frames and not from the line signal.

In practice, the data recovery scheme according to the invention is implemented in conjunction with other data recovery scheme(s). Some examples of data recovery schemes with which the invention can be combined will now be described. One example of another data recovery scheme comprises blanking a group of at least two contiguous frames of the line signal. In this scheme, two or more frames are blanked and the succeeding frame is copied to the first blank frame and the preceding frame to the last blank frame. Thus, in the case where if at least three adjacent frames in a line signal are to be blanked, the succeeding frame is copied to the first blank frame and the preceding frame to the last blank frame.

In another embodiment, the other data recovery scheme comprises a recovery scheme which is suitable for a very narrow noise impulse such as that reported by Hossein Sedarat, Krista S. Jacobsen (2Wire), VDSL2: Periodic Impulse Noise: How predictable is it?" ITU-T SG15 Q4 Geneva, 29 November-3 December 2004, filename: T05-SG15-041129-D-0035!!MSW-E.doc. Sedarat reports that some sources of noise can produce pulses so narrow they could be 'missed' by falling in the ADSL cyclic prefix period ($\frac{1}{69}$ ms). Bernd Heise (Infineon Technologies) in "Frame Repetition to combat REIN" ITU-T SG15 Q4 Ghent, Belgium, 12-16 Jun. 2006, filename: GB-064.doc, has proposed another data recovery scheme in which an 'at risk' symbol is a copy of a neighbour. This scheme predicts which an ADSL symbol most likely be hit and which of its neighbours is next most likely, and then sends a copy of the next most likely symbol in the at risk symbol. In this scheme, if a noise pulse obliterates the first symbol, the blanking scheme operates in the conventional way, i.e., no payload data will have been lost as the frame has been blanked, if the pulse obliterates the second symbol, then a copy is provided which repairs the damage. This means that if the pulse clips the adjacent end frames, then a clean copy of the line signal can be regenerated by inserting the relevant symbols from within the frames impacted by inserting the copied symbol(s).

The benefit of this scheme is that it allows a smaller blanking budget, i.e., less frames are blanked to recover corrupted frames. It also allows for parts of different frames to be combined. However, if a frame is equal to just one discrete multi-tone (DMT) symbol this data recovery scheme is only possible if the duplicated symbols are identical, which precludes it from being operated in conjunction with a parity data recovery scheme according to the invention as those skilled in the art will appreciate that where the invention requires two "blanking" frames to carry parity blocks, the contents of each parity block will differ.

Another data recovery scheme which can be combined with a parity scheme according to an embodiment of the invention comprises a Reid-Solomon (RS) checksum data recovery scheme. In this scheme, a number of frames in a mains-power cycle are grouped together to provide a number of redundant frames in the same way as a conventional RS/interleaving scheme. In this embodiment, the need to keep track of the phase of the noise burst can be considerably reduced, as the receiver of the line signal in the communications system does not need to determine which frames are obliterated by noise providing they do not exceed a predetermined limit.

In another embodiment of the invention the "priority block" data recovery scheme is combined with a scheme in which the length of individual codewords is set to the same period as the mains power cycle, i.e., each codeword is interleaved so it is spread evenly across the frames of the cycle. This gives each codeword the redundancy to repair up to the budgeted number of frames. In this embodiment, if a frame loss is detectable, the RS decoder can correct any data loss so the redundancy is quantitatively the same as the loss of the budgeted number of frames.

This embodiment removes the need for the data correction scheme to have to predict the positions of the frames which will be blanked by noise impulses. This may be particularly advantageous for those noise types where some frames inside the noise burst are undamaged. Unfortunately, the latency is equal to a mains electrical power cycle period and generally the mains electrical power cycle period is not an exact number of frames in the line signal.

In another embodiment of the invention, a hybrid approach with classical blanking is implemented. In this embodiment it is possible to predict roughly where a noise impulse event will occur in the form of a particular run of frames and up to how many frames are to be repaired. The hybrid data recovery scheme then fills the particular run of frames with RS codewords equally distributed across them so that each codeword has an equal portion of itself in each of the frames and each frame has sufficient redundancy to repair any potentially lost frames. The latency in this embodiment is dependent on the longest run of frames and the prediction position can be readjusted every half cycle by the line signal equipment implementing the data recovery scheme prior to transmission within the network.

Figure 8:
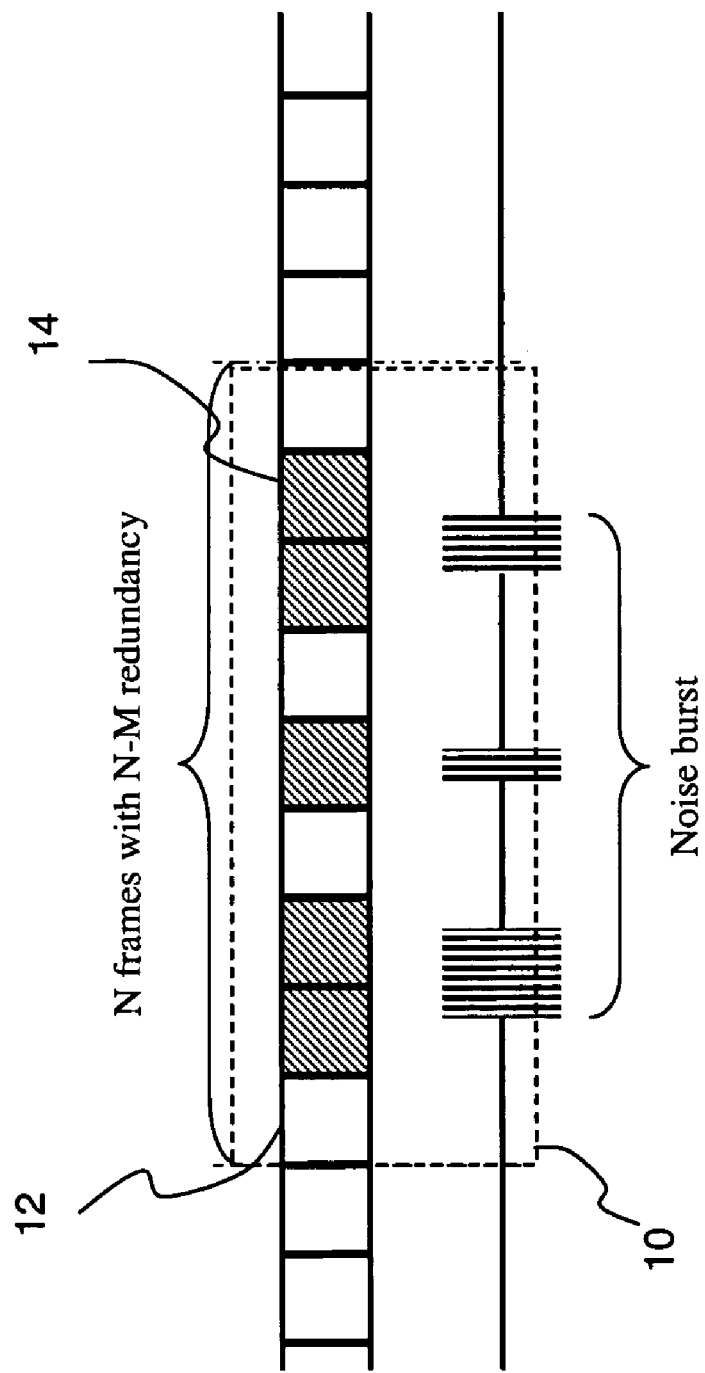
FIG. 8 shows schematically a data recovery scheme protecting a plurality of frames according to an embodiment of the invention.

FIG. 8 shows an example of how this embodiment of the invention could be implemented. In this embodiment, a control and/or management system enables the line signal transmission equipment to determine how long a block 10 of N frames is to be protected (N frames 12,14), how much protection to apply (N-M frames of redundancy, i.e., redundant frames 14), and where to position the block for the current half cycle, where M is the number of frames of payload 12 in a half-cycle. This scheme does not assume that the end frames of the block are damaged.

As shown in FIG. 8, a particular noise burst is shown impacting (effectively erasing) five frames of data. The data is recoverably using this embodiment of the invention if the five frames are within a predicted block having at least five frames of redundancy. In FIG. 8, an enclosing frame block 10 comprises N frames 12,14 (N=9 in FIG. 8) and carries up to M payload frames 12 (M=4 in FIG. 8). Thus this scheme implements a protection scheme for N-M=five or more RS checksum frames 14 enabling up to five line signal data frames to survive the noise burst. Importantly, the surviving frames do not need to be frames which carry payload as the M payload frames 12 are fully recoverable providing there are at least M or more good frames.

Some expected unharmed frames can be included at each end so that placement of the block may have some tolerance, which enables the XOR parity scheme of the invention to provide additional protection. In this case, N=3 and M=2 (resulting in 1 redundant frame) with different parity arithmetic.

Modifications to the above features of the invention and features having equivalent effect to the features known to those skilled in the art are implicitly included in the description, and the scope of the invention should be determined by the accompanying claims.

For example, as noise pulses from even half cycles of the mains power will can differ from those of the odd half cycles and occur at different intervals, the prediction mechanism in one embodiment of the invention predicts each noise pulse series independently.

The corruption of the data is assumed to be sufficient for the data to not be recoverable, i.e., for the data to be lost in the corrupted frames. However, the level of corruption may be less in some embodiments of the invention and alternative recovery schemes may be viable with the invention being used in preference to such schemes.

The invention claimed is:

1. A method of transmitting data in a line signal to enable subsequent recovery of corrupted data, the corrupted data having been corrupted by repetitive noise events having one or more timing characteristics, each timing characteristic having a respective predicted value from which the occurrences of such noise events are predicted, the line signal comprising a series of data frames, the method comprising, for each predicted noise event:
   determining a group comprising one or more frames in said line signal, said group being coincident with the predicted value of the timing characteristic for a said predicted noise event; and
   determining one or more frames within the coincident group which will have their data corrupted due to coincidence with said predicted noise event; and
   transmitting sufficient redundant data in the line signal instead of said frames whose data would be corrupted due to coincidence with said predicted noise event to enable recovery of data lost from one or more adjacent frames in said line signal, if at least one timing characteristic differs from its respective predicted value for at least one noise event.

2. The method as claimed in claim 1, wherein one or more frames whose data is predicted to be corrupted to an unrecoverable level is blanked and does not carry any line signal data.

3. The method as claimed in claim 1, wherein one or more frames whose data is predicted to be corrupted to an unrecoverable level is blanked and does not carry any line signal data, and wherein one or more of said blanked frames is provided instead with data enabling recovery of said data corrupted from said line signal if at least one timing characteristic of a noise event differs from a respective predicted value.

4. The method as claimed in claim 1, wherein a timing characteristic comprises a duration of the noise event.

5. The method as claimed in claim 1, wherein a timing characteristic comprising a repetition time for the noise event.

6. The method as claimed in claim 1, further comprising:
   receiving the line signal at a receiver; and
   recovering any data in said line signal which is corrupted due to one or more of said noise events.

7. The method as claimed in claim 1, wherein redundant data is included within in one or more frames of each group using a parity data correction scheme.

8. The method as claimed in claim 1, wherein redundant data is included within in one or more frames of each group using a parity data correction scheme and further comprising:
   determining one or more preceding and/or succeeding frames adjacent to said group; and
   if data of said one or more preceding and/or succeeding frames adjacent to said group of frames is corrupted due to one or more of said duration and timing characteristics differing from its predicted value,
   recovering said data at a receiver using said redundant data included within one or more frames of a group using said parity data correction scheme, said redundant data together with data from one or more uncorrupted adjacent frames of said line signal enabling the corrupted data to be recovered.

9. The method as claimed in claim 1, wherein redundant data is included within in one or more frames of each group using a parity data correction scheme and further comprising:
   determining one or more preceding and succeeding frames adjacent to said group; and
   if data of said one or more preceding and/or succeeding frames adjacent to said group of frames is corrupted due to one or more of said duration and timing characteristics differing from its predicted value,
   recovering said data at a receiver using said redundant data included within one or more frames of a group using said parity data correction scheme, said redundant data together with data from one or more uncorrupted adjacent frames of said line signal enabling the corrupted data to be recovered, and
   wherein redundant data is included within in one or more frames of each group using a parity data correction scheme and wherein the parity data correction scheme is implemented as an XOR operation by one or more frames in said group and one or more uncorrupted adjacent frames.

10. The method as claimed in claim 1, wherein redundant data is included within in one or more frames of each group using a parity data correction scheme and further comprising:
   determining one or more preceding and succeeding frames adjacent to said group; and
   if data of said one or more preceding and/or succeeding frames adjacent to said group of frames is corrupted due to one or more of said duration and timing characteristics differing from its predicted value,
   recovering said data at a receiver using said redundant data included within one or more frames of a group using said parity data correction scheme, said redundant data together with data from one or more uncorrupted adjacent frames of said line signal enabling the corrupted data to be recovered, and
   wherein redundant data is included within in one or more frames of each group using a parity data correction scheme and wherein the parity data correction scheme is implemented as an XOR operation by one or more frames in said group and one or more uncorrupted adjacent frames, and
   wherein the parity data correction scheme is implemented as a Reed-Solomon error correcting code by one or more frames in said group and one or more uncorrupted adjacent frames.

11. A method of recovering data in a line signal which is subjected to repetitive noise impulses having a predicted timing interval or duration, the line signal comprising a series of data frames, the method comprising:
    predicting a group comprising one or more frames in said line signal which are expected to be corrupted by a noise impulse;
    blanking said group of one or more frames which are predicted to be corrupted;
    determining one or more preceding and/or of succeeding frames adjacent to said group, wherein each said group of one or more frames includes one or more parity blocks to enable recovery of data lost if said noise impulse deviates from its predicted timing interval or duration and corrupts the data carried in one or more of said frames adjacent to said group; and
    recovering the corrupted data at a receiver of said line signal using one or more of said parity blocks of said blanked group of one or more frames and any of said adjacent frames of said line signal which are not corrupted.

12. The method as claimed in claim 11, wherein the parity blocks are generated using a parity operation which comprises an XOR operation.

13. The method as claimed in claim 12, wherein the parity operation comprises an XOR operation which operates in combination with an interleaving data recovery scheme.

14. A receiver arranged to recover data in a line signal lost by a repetitive noise signal corrupting the line signal, the repetitive noise signal comprising noise events having predictable timing and duration characteristics, each timing and duration characteristic having a respective predicted value from which the occurrences of such noise events are predicted, the line signal comprising a series of data frames, wherein the line signal has been transmitted by an apparatus comprising one or more processors arranged for, each predicted noise event, at least;
    to determine a group comprising one or more frames in said line signal, said group being coincident with the predicted timing and duration of a said predicted noise event signal; and
    to determine how many frames within the coincident group will be lost due to coincidence with said predicted noise event; and
    to include in the coincident group sufficient redundant data to enable recovery of data lost from said line signal by the receiver in the event one or more of said duration and timing characteristics differ from its predicted value.

15. An apparatus arranged to transmit a line signal to a receiver apparatus in a communications network, the line signal comprising a series of data frames and being predicted to be subjected to repetitive noise impulses having a predicted timing interval or duration, in a communications network to a receiver apparatus, the apparatus comprising:
    a forecaster configured to predict a group comprising one or more frames in said line signal which are expected to be corrupted by a noise signal; and
    one or more signal processors arranged to at least:
        blank said group of one or more frames which are predicted to be corrupted;
        determine the preceding and succeeding frames adjacent to said group;
        include in each said group of one or more blanked frames one or more parity blocks, wherein if said noise signal deviates from its predicted timing interval or duration and corrupts the data carried in one or more of said frames adjacent to said group, the corrupted data is recoverable by the receiver apparatus using one or more of said parity blocks of said blanked group of frames and any of said adjacent frames of said line signal which are not corrupted.

* * * * *